United States Patent [19]
Schaad et al.

[11] 3,809,825
[45] May 7, 1974

[54] RECEIVER FOR INDUCTIVE COMMUNICATION SYSTEM
[75] Inventors: Howard A. Schaad, Abingdon, Ill.; Richard L. Randolph, Maryland Heights, Md.
[73] Assignee: William J. Foley, Galesburg, Ill.
[22] Filed: Apr. 26, 1972
[21] Appl. No.: 247,548

Related U.S. Application Data
[63] Continuation-in-part of Ser. No. 844,047, July 23, 1969, Pat. No. 3,660,760.

[52] U.S. Cl. ............................................. 179/82
[51] Int. Cl. ......................................... H04b 5/00
[58] Field of Search .............. 179/82; 343/787, 788; 325/28

[56] References Cited
UNITED STATES PATENTS
3,549,818  12/1970  Turner................................ 179/82

Primary Examiner—Ralph D. Blakeslee
Attorney, Agent, or Firm—Browne, Beveridge, DeGrandi & Kline

[57] ABSTRACT

There is disclosed a receiver apparatus for inductive communication systems. A flat high mu metal, core carrying a multi layer coil has an end on the inside layer connected to the input terminal of a low level integrated circuit amplifier and the coil end on the outside layer is connected to ground terminal of the amplifier.

4 Claims, 3 Drawing Figures

PATENTED MAY 7 1974　　　　　　　　　　　　　　　　　　3,809,825

RECEIVER FOR INDUCTIVE COMMUNICATION SYSTEM

This is a continuation-in-part application of Application Ser. No. 844,047 filed July 23, 1969 now U.S. Pat. No. 3,660,760.

BACKGROUND OF THE INVENTION

This invention relates to communication systems and more particularly to a new and novel method and apparatus for transmitting information within a well defined area by establishing therein a sustained dynamic induction signal field.

Inductive loop communication systems have been successfully employed in many situations where limited area coverage was desired. In this type of system a receiver is used which is activated by a fluctuating magnetic field induced from a signal-carrying current flow through a conducting wire loop. However, because the flux of the induced magnetic field falls off rapidly as distance is increased from the conducting wire, the space which can be effectively covered within the loop is severely limited, while outside the loop a useful signal extends only a short distance. Efforts have been made to communicate by conductive currents in moist earth and water as exemplified by Monroe et al, U.S. Pat. No. 3,273,110, McNiven U.S. Pat. No. 3,499,195, Sato U.S. Pat. No. 3,268,854, and Curry U.S. Pat. No. 3,256,972. In such prior art systems detection normally requires that probes be immersed or embedded in the energized medium and in any case such systems do not utilize a broad magnetic induction field as disclosed herein. A significant improvement in inductive communication systems is disclosed in our above-identified application, as these disclosed conductive currents in the earth base are avoided and a large magnetic signal induction field extends above the surface where its signal is detected by small portable receivers such as a coil, amplifier, and a utilization device such as a speaker or earphone to produce sound. In accordance with a feature of this invention, the coil has a plurality of windings, the inside layer or turn closest to the core, which is a lamina of a high mu metal, being connected at one end to the input terminal of the amplifier and the end on the outer winding layer or turn being connected to ground terminal of the amplifier. The signals picked up or detected by the receiver may be reproduced in their original form which may be a pulse signal, tone, voice message, music, or other unmodulated or modulated signals.

DESCRIPTION OF THE DRAWINGS

The above and other objects, features and advantages of the invention will best be understood from the following description taken in conjunction with the accompanying drawings in which:

Referring now to FIG. 1, there is disclosed a signal voltage source 10 which, in the embodiment disclosed is a conventional audio power amplifier which may have push-pull output stages connected through the primary windings 13 of transformer 14, the center tap of primary 13 being connected to the B+ of the power supply. The core 17 of transformer 14 may be connected to alternating current electrical ground by way of the normally provided third or ground conductor to the power supply, indicated generally by the numeral 18. A selector switch 11 may be used to connect a primary signal source to the input of amplifier 10, as for example microphone 12M, or phonograph 12P or radio 12R or any other signal source may be used.

Figure 1:
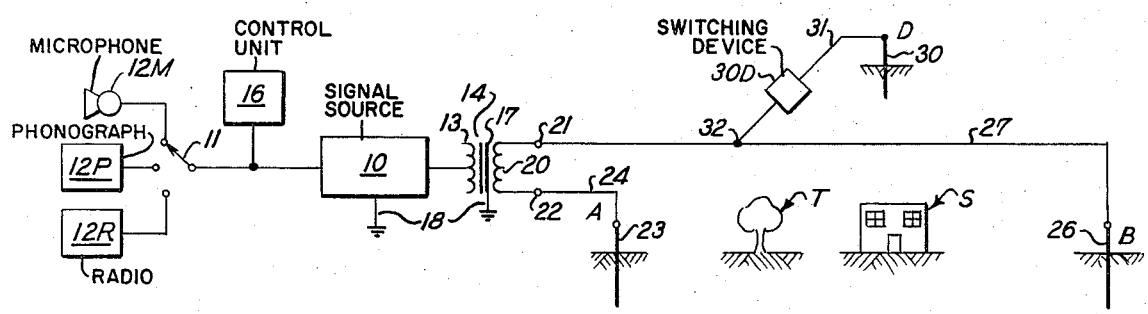
FIG. 1 is an explanatory block diagram from applicants' above-identified applications in which spaced points or locations on the earth are illustrated in fragmentary partial cross-sections, it being understood that the same are connected by a common earth mass, the dielectric media being excited.

The upper and lower ends of transformer secondary 20 constitute the output terminals 21 and 22 of amplifier 10. Terminal 22 may be wired directly to ground connections 18. In any case, there appears at the output terminals of the audio amplifier 10 a signal voltage which is to be communicated to within a prescribed geometrical pattern or area on the surface of the earth. Thus, output terminal 22 is connected to a near conductive element 23 vertically driven into the ground at point "A" for a distance of between about 2 to 6 feet, 3 feet usually being sufficient. The conductor 24 connecting output terminal 22 to vertical earth exciting conductor element 23 is a low resistance wire as for example No. 10 copper wire. A first remote conductor element 26 at remote point B is connected to output terminal 21 by a low resistance insulated conductor wire 27 so that the output signal voltage appearing at output terminals 21 and 22 is applied to vertical earth exciting conductive elements 23 and 26 to thereby establish an electrostatic force field between conductor elements 23 and 26, respectively. This electrostatic field has equipotential lines of electrostatic force extending in a broad symmetrical pattern between the conductor elements and existing well beyond the vertical conductive elements and induces the magnetic signalling field.

Such magnetic signal field is relatively uniform at least within a broad area of the geometrical pattern to thereby provide a wide are of resolution or detectable signal strength. Both conductor elements 23 adn 26 are driven to essentially the same depth in the ground (namely about 3 feet) and are non-corrosive, a very useful conductor element being stainless steel rods of about ⅝ inch in diameter. The size of the area can be adjusted by varying the power input signal or by varying the spacing between conductor elements. For example, by moving conductor element 26 further away from vertical element 23, the length of the magnetic induction field is accordingly lengthened and, significantly, the width of the magnetic induction field is likewise increased (not linearly). In the embodiment shown in FIG. 2, this may be accomplished automatically through the switching circuitry to be described in detail hereinafter. The use of displacement current effects and avoidance of direct conductive current paths in the earth media is disclosed in greater detail in our above-identified application. In our application Ser. No. 150,429, filed June 7, 1971, a direct conductive path in a building structure is disclosed, so it will be appreciated that the receiver hereof is useful with any form of magnetic induction signalling equipment.

In order to change the geometrical shape of the induction signal field pattern in a direction laterally of the line between points A and B, a further laterally located vertical conductive element 30 may be driven in the ground at a suitable distance laterally of a line between points A and B, as for example, at point D. Vertical conductor element 30 is connected by a wire conductor 31 through a switching device 30-D (which may be eliminated) to wire 27 at point 32. Wire 31 should have an impedance, per foot of length, relative to the impedance of the main transmission wire 27 which is higher than the impedance of the insulated wire conductor between points A and B and if the impedance between 32 and D and 32 and B is equal then the impedance of the wire may be the same, assuming similar impedances at the vertical conductor elements. Switching element 30-D is controlled by coded signals carried on wire 27. In the disclosed embodiment such coded signals are selectively transmitted from control unit 16 in the form of a coded sequence of pulses of a selected frequency, spacing etc. Switching device 30-D may be a conventional tone relay which is made responsive thereto.

RECEIVER CIRCUIT

Figure 3:
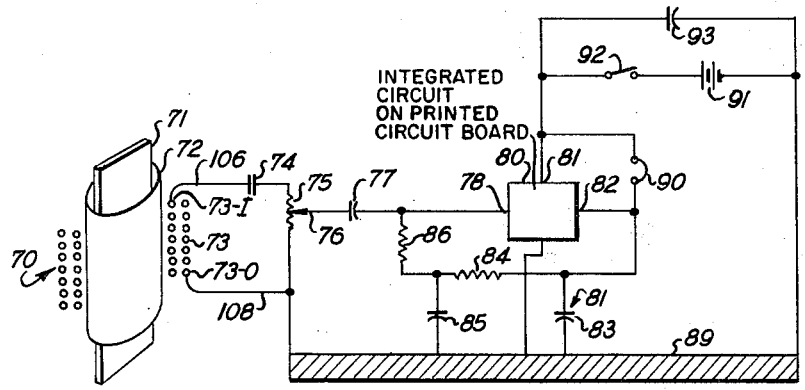
FIG. 3 illustrates a circuit diagram of a receiver or detection unit and utilization device for detecting magnetic induction signaling fields as produced by the systems shown in FIG. 1.

As shown in FIG. 3, the receiver circuit comprises a pickup coil 70 having a high permeability laminated flat core 71 (which is described in greater detail hereinafter), from which induced signal currents are applied to an amplifier 80 (which in the embodiment shown, is an integrated circuit low level amplifier and is a silicon monolithic integrated circuit amplifier having three stages of DC coupled amplification), a utilization device such as a headphone or earpiece 90, a power supply such as batteries 91 and an operating switch 92 to connect the battery to the circuit. Switch 92 may be of the type actuated closed on insertion of the earphone plug (not shown) into a jack. A feedback circuit 81 is also provided to eliminate noise signals as may be induced by power lines and the like which operate at 60Hz, or high frequency signals above the audio range.

Figure 2:
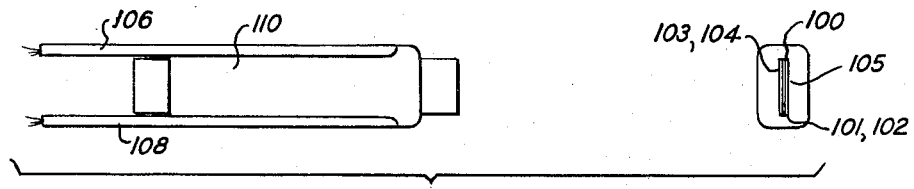
FIG. 2 illustrates a preferred coil form.

As shown in FIG. 2, the coil 70 is constituted by a flat non-conductive, non-inductive plastic mandrel 100 (which is about 1/16 inch thin, ¼ inch wide and about 2 ¼ inches long). Two core lamina 101 and 102 on one side thereof and two core lamina 103 and 104 on the other side, said core lamina being a Supermalloy (TM) laminate from Arnold Engineering Company (each being 0.001 inch thick, 3/16 inch wide and 1 ¾ inches long). The coil windings are constituted by about 3,250 turns of No. 36 gauge magnet wire. The inner winding layer 105 has its end connected to output lead wire 106 and the outermost winding layer 106 has its end 107 connected to output lead 108. The coil is sealed in an insulating enamel or plastic coating 110. In a modification of the coil described in connection with FIG. 3, the coil form is cylindrical.

The pickup coil of FIG. 3 includes a cylindrical form 72 on which is wound multilayered coil 73 which, with the form of core 72 shown, may effectively include approximately 2,500 turns of 38 gauge ware. This coil form has an inside diameter of about three-eighths of an inch and the coil, after winding, has an outside diameter of about five-eighths of an inch, the end 73-0 being at the outside winding layer and the end 73-1 being at the innermost winding layer. The core material 71 is a single laminate 2-⅛ inches long, about 25 mils thick and ⅛ inches wide of a high mu metal, as for example, core material designated as high mu 80 laminate as produced and sold by the Magnetic Metals Company. A high mu metal is one having a high permeability and is composed of an isotropic magnetic alloy having approximately 78 percent nickel. Several different alloys with similar characteristics are designated as mu metals in the art. In the embodiment shown the core has a width approximately the width of the inside diameter of the coil and a length which is somewhat greater than the axial length of the coil. It has been found that increasing the length of the core 71 to approximately 200 percent (or about 3 times) the length of the coil 73 provides an economical and highly efficient pickup coil-core structure for magnetic induction fields in the audio range; the response flattening out when the core length is increased above 200 percent. However, it is to be understood that other coil and core configurations have been effectively utilized, as for example, 6,000 turn coils having a different high permeability core material completely filling the core have been effectively utilized; and a 2,500 turn coil wound on a flat core (to achieve a smaller structure) has been used, the former being somewhat more expensive and the latter being somewhat less efficient. FIG. 2 is an example of a preferred flat core form.

Not shown in FIG. 3 is a low frequency filter which may be connected across the coil output terminals 73-1 and 73-0 to eliminate background noise signals as for example may be generated by high voltage power lines and other nearby devices. An additional filter (not shown) to eliminate high frequency noise and radio signals may also be connected to coil ends 73-1 and 73-0. The signal currents induced in winding 73 are coupled through a coupling capacitor 74 (which is preferably connected to end 73-1 for better response) to potentiometer 75 which has a wiper arm 76 connected to a second coupling capacitor 77 to apply signals to the input terminal 78 of integrated circuit amplifier 80. The battery voltage from battery 91 is applied to terminal 81 on integrated circuit amplifier 80 on closure of switch 91.

The signal output of integrated circuit amplifier 80 is taken from across output terminal 82 and power supply terminal 81 and in the embodiment illustrated in a high impedance or high resistance headphone or earphone 90 (which is preferably non-magnetic or relatively insensitive to magnetic fields). This provision thereby eliminates a source of signal distortion since the original signals are induced from a dynamic magnetic signal field and without further precaution, it is possible that when using magnetic induction type reproduction or utilization devices, as for example, a conventional loudspeaker having a voice coil therein to cause distortions so precautions should be taken so as to exclude the induction or inducing of signal voltages in such coils. A filter capacitor 93 is connected across battery and switch 92.

Negative feedback circuit 81 includes a shunt capacitor 83, resistor 84 and a further shunt capacitor 85, capacitor 83 and 85 along with resistor 84 forming a pi filter. The filtered feedback voltage appearing across capacitor 85 is applied through a dropping resistor 86 to input terminal 78 of integrated circuit amplifier 80. Capacitor 85 provides roll off of the negative feedback above about 200 Hz and capacitor 83 shunts out or bypasses to ground high frequency and noise signals.

Exemplary component values for the circuit of FIG. 3 are as follows:

| | |
|---|---|
| Capacitor 74 | .027 microfarad |
| Potentiometer 75 | 10 K ohm |
| Capacitor 77 | .01 microfarad |
| Integrated circuit amplifier 80 | Model TAA 263 (Amperex) |
| Capacitor 83 | .1 microfarad |
| Resistor 84 | 270 K ohm |
| Capacitor 85 | 10 microfarad |
| Resistor 86 | 5.6 K ohm |
| Capacitor 93 | 1.0 microfarad |
| Battery 91 | 2.8 Volt (two penlight mercury batteries) |
| Earphone 90 | 3,000 ohm (1.1k DC resistance) |
| Coil 73 | 2,500 turns No. 38 wire on ⅜" cylindrical coil form |
| Core 71 | High Mu 80 laminate ⅜" wide . . . 2" long . . . Magnetic Metals Company |

The above components were mounted on an etched printed circuit board in which a relatively large "land mass" of unetched metal was left on the board to serve as the ground or common of the circuit. In FIG. 3 the "land mass" is designated by the numeral 89, but it will be appreciated that this land mass may be irregularly shaped.

What is claimed is:

1. In an induction communication system, apparatus for detecting signals in a dynamic magnetic field, comprising
   a coil,
   a high permeability core,
   said core including a thin flat member of a high mu metal and having a width substantially equal to an inside dimension of said coil, a utilization device, said utilization device includes a low level amplifier and a speaker, said speaker being relatively insensitive to said dynamic magnetic field,
   said coil comprises a plurality of winding layers and wherein the coil end on the inside layer closest to said core is connected to the signal input terminal of said amplifier and the coil end on the outside winding layer is connected to the ground terminal of said amplifier.

2. The invention defined in claim 1 wherein said coil is cylindrical.

3. The invention defined in claim 1 wherein said coil is flat.

4. The invention defined in claim 1 including a printed circuit board having a large planar area of unetched conductive metal thereon to constitute a large land mass on said board and wherein the ground terminal of said integrated circuit amplifier is connected to said large land mass.

* * * * *